Aug. 13, 1940.   B. OSBORNE   2,211,545
GRIDDLE
Filed June 30, 1938
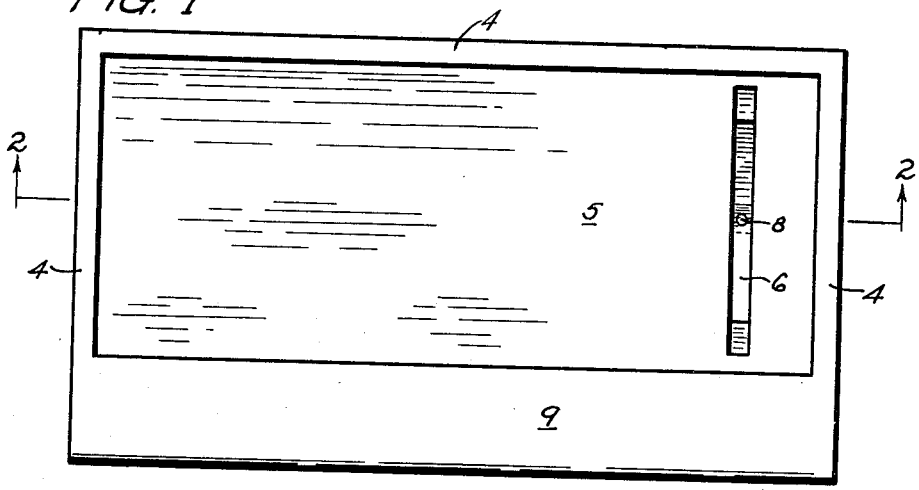
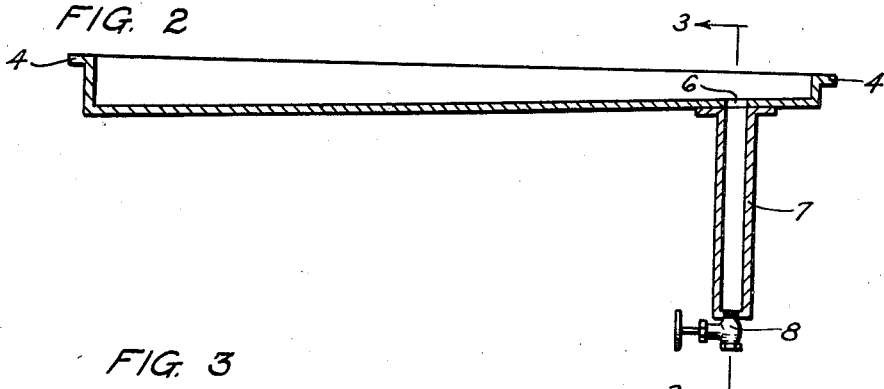
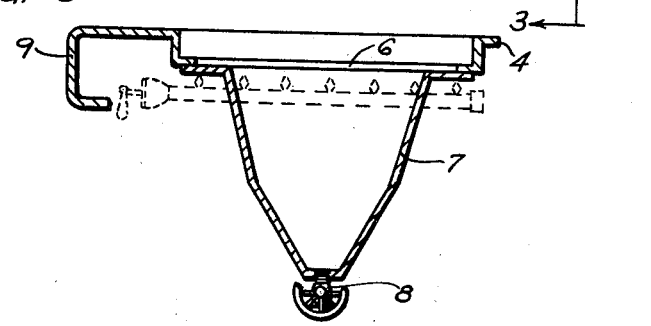
BEVERLY OSBORNE
INVENTOR
BY Hubert Miller
ATTORNEY Patented Aug. 13, 1940

2,211,545

UNITED STATES PATENT OFFICE 2,211,545

GRIDDLE

Beverly Osborne, Oklahoma City, Okla.

Application June 30, 1938, Serial No. 216,657

4 Claims. (Cl. 53—7)

This invention relates to gridirons or griddles for cooking various foods.

The invention is especially suitable for restaurants, boarding houses and the like where a considerable quantity of food is prepared at one time. In frying chicken or in cooking hamburgers and the like, tiny particles of the meat or of the flour or meal in which the meat is rolled become detached from the individual pieces being cooked and not only give the griddle a very unattractive appearance but also make it very difficult to cook other pieces of meat properly. To avoid these objections it has previously been necessary to clean the griddle thoroughly after each cooking of meat. This is usually done with a spatula and results in the loss of a considerable amount of grease.

It is the chief object of my invention to provide a griddle which may be easily cleaned free of the above mentioned particles without the loss of any grease whatever and without the loss of the ordinary amount of time which is consumed in cleaning the griddle.

The details in the construction of a preferred form of my invention together with other objects attending its production will be better understood from the following description when read in connection with the accompanying drawing, which is chosen for illustrative purposes only, and in which, Figure 1 is a plan view of a griddle constructed according to the principles of my invention;

Figure 2 is a sectional view taken along the line 2—2 of Figure 1; and

Figure 3 is a sectional view of the griddle taken along the line 3—3 of Figure 2.

I prefer to construct the griddle of a size suitable for resting on the top of an ordinary size gas hot plate, the burners and feed pipes of which are shown in dotted lines in Figure 3. From Figure 2 it will be seen that I prefer to construct the griddle so that one of its ends is slightly lower than the other end while the upper flange 4 of the griddle lies in a horizontal plane. The making of one end of the griddle lower than the other is not absolutely necessary as the same purpose would be served by slightly tilting one end of the griddle. The surface 5 is, of course, perfectly flat. Near one end of the cooking surface 5, I provide a through cross-slot 6, and on the under side of the griddle, in alignment with the slot 6, I provide a narrow elongated grease reservoir 7. The reservoir 7 may be spot welded or attached in any other suitable manner to the under side of the griddle. The reservoir 7 is provided at its lower end with any suitable drain valve 8. I prefer to provide an extended overlapping flange 9 along one edge of the griddle mainly to prevent grease, etc., from dripping on the valve handles and mixer valves of the gas hot plate. This extended flange is not, of course, a necessary part of the device but is simply a convenience.

In operation the reservoir 7 is filled with grease and an additional amount of grease is placed in the lower end of the griddle, the amount of grease being governed by the type of cooking being done. As food is cooked on the cooking surface 5 between the slot 6 and the opposite end of the griddle and particles of food become detached from the individual pieces, these particles are simply scraped to the reservoir end of the griddle. During the scraping of these pieces into the space between the reservoir 6 and the adjacent end of the griddle a considerable amount of grease is also scraped up to this end of the griddle. The grease scraped along with the food particles naturally begins to flow toward the low end of the griddle and in doing so it carries with it the particles of food or meal. Since the reservoir 7 is already full of grease the excess grease passes over the reservoir and carries the food particles into the slot 6 where they drop to the bottom of the reservoir and are stored there, and emptied when it is convenient.

With such a griddle the actual cooking of food need not be interrupted. Immediately after the particles are scraped to the reservoir end of the griddle additional food can be placed on the cooking surface and the cooking continued and this cleaning of the griddle can actually be carried on during the cooking operation if desired. This griddle results in the use of approximately 50% less actual grease than is used on the ordinary griddle today.

While I have illustrated the grease reservoir 7 in substantially V-shaped cross-section it is not necessary to the operation of the invention that the reservoir be so shaped. A griddle of rectangular cross-section or of semi-circular cross-section would serve equally as well. The only reason for having the V-shaped cross-section is to reduce the actual amount of grease carried by the reservoir. I also call attention to the fact that it is not necessary that the inside edges of the reservoir be off-set with relation to the ends of the slot 6 as I have illustrated. I prefer this construction simply because it permits the reservoir to be received inside the walls of the gas hot plates generally in use.

While I have described and illustrated a specific embodiment of my invention I am aware that numerous alterations and changes may be made therein and I do not wish to be limited except by the prior art and the scope of the appended claims.

I claim:

1. A gridiron or cooking griddle comprising: a four walled flat cooking plate adapted to be used with one of its ends slightly lower than its other end; a through cross slot nearer the high end intermediate the ends of said plate and extending substantially from one of its edges to the other; and a grease reservoir, the open upper end of which is in direct communication with said slot only.

2. A gridiron or cooking griddle comprising: a plate having a flat smooth upper surface and adapted to be used with one of its ends slightly lower than its other end; four walls surrounding the plate; a through slot near the higher end of the plate extending substantially across the plate from edge to edge; a grease reservoir below the surface of said plate, the open upper end of said reservoir being in communication with said slot only; and valve means in the bottom of said reservoir for emptying its contents.

3. A griddle comprising: a flat bottomed, four walled pan, the top rim of which is horizontal and the depth of which increases gradually from one end to the other; a lateral through slot in the bottom of said pan near the shallow end thereof; a combination grease reservoir and scrap trap below the surface of said bottom, the upper end of said reservoir being in open communication with the interior of said pan through said slot only, whereby when the grease reservoir is filled with grease, and scrap laden grease from the deep end of the pan is scooped to the shallow end thereof, the grease gravitates toward the deep end and as it passes over the reservoir the scraps gravitate to the bottom thereof permitting only scrap free grease to reach the deep end.

4. A griddle comprising: a bottom plate; opposite tapered side walls; and opposite end walls of different height, making the griddle greater in depth at one end than at the other end, although the upper edges of the side and end walls all lie in the same horizontal plane; a through lateral slot in said bottom near the shallow end of the griddle; and a grease reservoir the upper end of which is in open communication with said griddle through said slot only.

BEVERLY OSBORNE.